United States Patent
Telefus

(10) Patent No.: US 9,203,292 B2
(45) Date of Patent: Dec. 1, 2015

(54) ELECTROMAGNETIC INTERFERENCE EMISSION SUPPRESSOR

(71) Applicant: Power Systems Technologies Ltd., Ebene (MU)

(72) Inventor: Mark Telefus, Orinda, CA (US)

(73) Assignee: POWER SYSTEMS TECHNOLOGIES LTD., Ebene (MU)

(*) Notice: Subject to any disclaimer, the term of this patent is extended or adjusted under 35 U.S.C. 154(b) by 244 days.

(21) Appl. No.: 13/913,177

(22) Filed: Jun. 7, 2013

(65) Prior Publication Data

US 2013/0329466 A1  Dec. 12, 2013

Related U.S. Application Data

(60) Provisional application No. 61/658,245, filed on Jun. 11, 2012.

(51) Int. Cl.
   H02M 1/12    (2006.01)
   H02M 3/335   (2006.01)
   H02M 1/42    (2007.01)

(52) U.S. Cl.
   CPC .............. *H02M 1/12* (2013.01); *H02M 1/4258* (2013.01); *H02M 3/33507* (2013.01); *Y02B 70/126* (2013.01)

(58) Field of Classification Search
   CPC ............................ H02M 1/12; H02M 3/33507
   See application file for complete search history.

(56) References Cited

U.S. PATENT DOCUMENTS

| | | | |
|---|---|---|---|
| 4,273,406 A | 6/1981 | Okagami | |
| 4,370,703 A | 1/1983 | Risberg | |
| 4,563,731 A | 1/1986 | Sato et al. | |
| 4,645,278 A | 2/1987 | Yevak et al. | |
| 4,712,160 A | 12/1987 | Sato et al. | |
| 4,788,626 A | 11/1988 | Neidig et al. | |
| 4,806,110 A | 2/1989 | Lindeman | |
| 4,841,220 A | 6/1989 | Tabisz et al. | |
| 4,857,822 A | 8/1989 | Tabisz et al. | |

(Continued)

FOREIGN PATENT DOCUMENTS

| | | |
|---|---|---|
| EP | 1146630 A2 | 10/2001 |
| JP | 4217869 A | 8/1992 |

(Continued)

OTHER PUBLICATIONS

EE Times.com—"Team Claims Midrange Wireless Energy Transfer", by R. Colin Johnson, 4 pages, Nov. 6, 2007.

(Continued)

*Primary Examiner* — Emily P Pham
(74) *Attorney, Agent, or Firm* — Haverstock & Owens LLP

(57) ABSTRACT

An EMI emission suppressing system, apparatus and method that enables the EMI produced by high frequency switching of a switching circuit to be suppressed via the transfer of the higher order harmonic emissions to a frequency range below the standard EMI bandwidth of less than 150 KHz by applying low frequency modulation or jitter into the feedback of a switching signal of the switching circuit. The EMI suppression is achieved with minimal added ripple on the output signal of the switching circuit by using discontinuous modulations in the form of only applying the low frequency modulation when the switch or higher order harmonic producing element of the switching circuit is accessing, or drawing power from, the main power supply.

22 Claims, 1 Drawing Sheet

(56) References Cited

U.S. PATENT DOCUMENTS

| | | |
|---|---|---|
| 4,866,367 A | 9/1989 | Ridley et al. |
| 4,890,217 A | 12/1989 | Conway |
| 4,893,227 A | 1/1990 | Gallios et al. |
| 4,899,256 A | 2/1990 | Sway |
| 4,901,069 A | 2/1990 | Veneruso |
| 5,065,302 A | 11/1991 | Kanazawa |
| 5,090,919 A | 2/1992 | Tsuji |
| 5,101,322 A | 3/1992 | Ghaem et al. |
| 5,132,890 A | 7/1992 | Blandino |
| 5,235,491 A | 8/1993 | Weiss |
| 5,325,283 A | 6/1994 | Farrington |
| 5,365,403 A | 11/1994 | Vinciarelli et al. |
| 5,373,432 A | 12/1994 | Vollin |
| 5,442,540 A | 8/1995 | Hua |
| 5,459,652 A | 10/1995 | Faulk |
| 5,673,185 A | 9/1997 | Albach et al. |
| 5,712,772 A | 1/1998 | Telefus et al. |
| 5,768,118 A | 6/1998 | Faulk et al. |
| 5,786,992 A | 7/1998 | Vinciarelli et al. |
| 5,790,395 A | 8/1998 | Hagen |
| 5,811,895 A | 9/1998 | Suzuki et al. |
| 5,838,554 A | 11/1998 | Lanni |
| 5,841,641 A | 11/1998 | Faulk |
| 5,859,771 A | 1/1999 | Kniegl |
| 5,874,841 A | 2/1999 | Majid et al. |
| 5,905,369 A | 5/1999 | Ishii et al. |
| 5,923,543 A | 7/1999 | Choi |
| 5,949,672 A | 9/1999 | Bernet |
| 5,982,153 A | 11/1999 | Nagai et al. |
| 5,999,419 A | 12/1999 | Marrero |
| 6,009,008 A | 12/1999 | Pelly |
| 6,091,611 A | 7/2000 | Lanni |
| 6,183,302 B1 | 2/2001 | Daikuhara et al. |
| 6,191,957 B1 | 2/2001 | Peterson |
| 6,232,726 B1 | 5/2001 | Janczak |
| 6,272,015 B1 | 8/2001 | Mangtani |
| 6,275,397 B1 | 8/2001 | McClain |
| 6,307,761 B1 | 10/2001 | Nakagawa |
| 6,323,627 B1 | 11/2001 | Schmiederer et al. |
| 6,385,059 B1 | 5/2002 | Telefus et al. |
| 6,388,897 B1 | 5/2002 | Ying et al. |
| 6,390,854 B2 | 5/2002 | Yamamoto et al. |
| 6,396,716 B1 | 5/2002 | Liu et al. |
| 6,452,816 B2 | 9/2002 | Kuranki |
| 6,459,175 B1 | 10/2002 | Potega |
| 6,487,098 B2 | 11/2002 | Malik et al. |
| 6,549,409 B1 | 4/2003 | Saxelby et al. |
| 6,578,253 B1 | 6/2003 | Herbert |
| 6,721,192 B1 | 4/2004 | Yang et al. |
| 6,775,162 B2 | 8/2004 | Mihai et al. |
| 6,894,461 B1 | 5/2005 | Hack et al. |
| 6,919,715 B2 | 7/2005 | Muratov et al. |
| 6,989,997 B2 | 1/2006 | Xu |
| 6,990,000 B1 | 1/2006 | Rodriquez et al. |
| 7,035,126 B1 | 4/2006 | Lanni |
| 7,038,406 B2 | 5/2006 | Wilson |
| 7,061,195 B2 | 6/2006 | Ho et al. |
| 7,102,251 B2 | 9/2006 | West |
| 7,139,180 B1 | 11/2006 | Herbert |
| 7,202,640 B2 | 4/2007 | Morita |
| 7,208,833 B2 | 4/2007 | Nobori et al. |
| 7,212,420 B2 | 5/2007 | Liao |
| 7,215,560 B2 | 5/2007 | Soldano et al. |
| 7,239,532 B1 | 7/2007 | Hsu et al. |
| 7,274,175 B2 | 9/2007 | Manolescu |
| 7,315,460 B2 | 1/2008 | Kyono |
| 7,386,286 B2 | 6/2008 | Petrovic et al. |
| 7,450,388 B2 | 11/2008 | Beihoff et al. |
| 7,459,893 B2 | 12/2008 | Jacobs |
| 7,564,706 B1 | 7/2009 | Herbert |
| 7,596,007 B2 | 9/2009 | Phadke et al. |
| 7,605,570 B2 | 10/2009 | Liu et al. |
| 7,630,221 B2 | 12/2009 | Sui et al. |
| 7,652,463 B2 * | 1/2010 | Lin et al. ............ 323/288 |
| 7,659,678 B2 | 2/2010 | Maiocchi |
| 7,679,938 B2 * | 3/2010 | Ye et al. ............ 363/21.12 |
| 7,701,305 B2 | 4/2010 | Lin et al. |
| 7,924,578 B2 | 4/2011 | Jansen et al. |
| 8,059,434 B2 | 11/2011 | Huang et al. |
| 8,077,489 B2 | 12/2011 | Pellen |
| 8,094,473 B2 | 1/2012 | Moon et al. |
| 8,102,678 B2 | 1/2012 | Jungreis |
| 8,125,181 B2 | 2/2012 | Gregg et al. |
| 8,126,181 B2 | 2/2012 | Yamamoto et al. |
| 8,134,848 B2 | 3/2012 | Whittam et al. |
| 8,155,368 B2 | 4/2012 | Cheung et al. |
| 8,194,417 B2 | 6/2012 | Chang |
| 8,199,541 B2 | 6/2012 | Yang |
| 8,207,717 B2 | 6/2012 | Uruno et al. |
| 8,243,472 B2 | 8/2012 | Chang et al. |
| 8,344,689 B2 | 1/2013 | Boguslavskij |
| 8,363,434 B2 | 1/2013 | Lin |
| 8,369,111 B2 | 2/2013 | Balakrishnan et al. |
| 8,385,032 B1 | 2/2013 | Mao et al. |
| 8,400,801 B2 | 3/2013 | Shinoda |
| 8,410,768 B2 | 4/2013 | Huber et al. |
| 8,743,565 B2 | 6/2014 | Telefus |
| 8,749,210 B1 | 6/2014 | Nakao et al. |
| 2002/0008963 A1 | 1/2002 | Dibene et al. |
| 2002/0011823 A1 | 1/2002 | Lee |
| 2002/0036200 A1 | 3/2002 | Ulrich et al. |
| 2003/0035303 A1 | 2/2003 | Balakrishnan et al. |
| 2003/0112645 A1 | 6/2003 | Schlecht |
| 2003/0201758 A1 * | 10/2003 | Chen ............ 323/222 |
| 2004/0062061 A1 | 4/2004 | Bourdillon et al. |
| 2004/0149551 A1 | 8/2004 | Porter |
| 2004/0183510 A1 | 9/2004 | Sutardja et al. |
| 2004/0252529 A1 | 12/2004 | Huber et al. |
| 2005/0024016 A1 | 2/2005 | Breen et al. |
| 2005/0036338 A1 | 2/2005 | Porter et al. |
| 2005/0117376 A1 | 6/2005 | Wilson |
| 2005/0138437 A1 | 6/2005 | Allen et al. |
| 2005/0194942 A1 | 9/2005 | Hack et al. |
| 2005/0225257 A1 | 10/2005 | Green |
| 2005/0253636 A1 * | 11/2005 | Yang et al. ............ 327/172 |
| 2005/0254268 A1 | 11/2005 | Reinhard et al. |
| 2005/0270001 A1 | 12/2005 | Jitaru |
| 2006/0002155 A1 | 1/2006 | Shteynberg et al. |
| 2006/0022637 A1 | 2/2006 | Wang et al. |
| 2006/0152947 A1 | 7/2006 | Baker et al. |
| 2006/0213890 A1 | 9/2006 | Kooken et al. |
| 2006/0232220 A1 | 10/2006 | Melis |
| 2007/0040516 A1 | 2/2007 | Chen |
| 2007/0120542 A1 | 5/2007 | LeMay |
| 2007/0121981 A1 | 5/2007 | Koh et al. |
| 2007/0138971 A1 | 6/2007 | Chen |
| 2007/0247091 A1 | 10/2007 | Maiocchi |
| 2007/0263415 A1 | 11/2007 | Jansen et al. |
| 2007/0298653 A1 | 12/2007 | Mahoney et al. |
| 2008/0018265 A1 | 1/2008 | Lee et al. |
| 2008/0043496 A1 | 2/2008 | Yang |
| 2008/0191667 A1 | 8/2008 | Kernahan et al. |
| 2009/0034299 A1 | 2/2009 | Lev |
| 2009/0045889 A1 | 2/2009 | Goergen et al. |
| 2009/0147547 A1 * | 6/2009 | Yamashita ............ 363/21.16 |
| 2009/0196073 A1 | 8/2009 | Nakahori |
| 2009/0230929 A1 | 9/2009 | Sui et al. |
| 2009/0268487 A1 | 10/2009 | Park |
| 2009/0290384 A1 | 11/2009 | Jungreis |
| 2009/0300400 A1 | 12/2009 | DuBose |
| 2010/0039833 A1 | 2/2010 | Coulson et al. |
| 2010/0073964 A1 | 3/2010 | Tatsukawa et al. |
| 2010/0110732 A1 | 5/2010 | Moyer et al. |
| 2010/0156366 A1 | 6/2010 | Sakai et al. |
| 2010/0232180 A1 | 9/2010 | Sase et al. |
| 2010/0289466 A1 | 11/2010 | Telefus et al. |
| 2010/0317216 A1 | 12/2010 | Pocrass |
| 2010/0322441 A1 | 12/2010 | Weiss et al. |
| 2011/0096573 A1 | 4/2011 | Zhu et al. |
| 2011/0109248 A1 | 5/2011 | Liu |
| 2011/0132899 A1 | 6/2011 | Shimomugi et al. |
| 2011/0157924 A1 | 6/2011 | Huynh |
| 2011/0255311 A1 | 10/2011 | Hsu et al. |
| 2011/0261590 A1 | 10/2011 | Liu |

(56) References Cited

U.S. PATENT DOCUMENTS

| | | | |
|---|---|---|---|
| 2012/0112657 A1 | 5/2012 | Van Der Veen et al. | |
| 2012/0126764 A1* | 5/2012 | Urakabe et al. | 323/282 |
| 2012/0153866 A1 | 6/2012 | Liu | |
| 2012/0235507 A1* | 9/2012 | Choi et al. | 307/104 |
| 2012/0268084 A1 | 10/2012 | Wang et al. | |
| 2013/0027011 A1 | 1/2013 | Shih et al. | |
| 2013/0049709 A1 | 2/2013 | Fu et al. | |
| 2013/0148385 A1 | 6/2013 | Zhang | |
| 2014/0078790 A1 | 3/2014 | Lin et al. | |
| 2014/0091839 A1 | 4/2014 | Peters et al. | |
| 2014/0153299 A1 | 6/2014 | Jeong et al. | |
| 2015/0002108 A1 | 1/2015 | Kim | |

FOREIGN PATENT DOCUMENTS

| | | |
|---|---|---|
| JP | 10243640 A | 9/1998 |
| JP | 2000083374 A | 3/2000 |
| JP | 20000253648 A | 9/2000 |
| JP | 2004208357 A | 7/2004 |

OTHER PUBLICATIONS

EE Times. com—"Wireless Beacon Could Recharge Consumer Devices", by R. Colin Johnson, 3 pages, Nov. 6, 2007.

Novel Zero-Voltage and Zero-Current Switching (ZVZCS) Full Bridge PWM converter Using Coupled Output Inductor, Sep. 2002 IEEE, pp. 641-648.

"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.

"Randomized Modulation in Power Electronic Converters". Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression", K.K. tse, et al. Member IEEE, IEEE Transactions on Power Electronics, vol. 15., No. 2, Mar. 2000, pp. 399-410.

"Practical on-Line Identification of Power Converter Dynamic Respones", Botao Miao et al., Colorado Power Electronics Center, ECE Department, 2005, pp. 57-62.

"A Modified Cross-Correlation Method for System Identification of Power Converters with Digital Control", Botao Miao et al., Colorado Power Electronics Center, ECE Department, 2004, pp. 3728-3733.

"Design and Implementation of an Adaptive Tuning System Based on Desired Phase Margin for Digitally Controlled DC-DC Converters", Jeffrey Morroni et al., Member IEEE, 2009, pp. 559-564.

* cited by examiner

ELECTROMAGNETIC INTERFERENCE EMISSION SUPPRESSOR

RELATED APPLICATIONS

This Patent Application claims priority under 35 U.S.C. 119 (e) of the U.S. provisional application Ser. No. 61/658, 245, filed, Jun. 11, 2012, and entitled "Electromagnetic Interference Emission Suppressor". This application incorporates U.S. provisional application, serial number in its entirety by reference.

FIELD OF THE INVENTION

The present invention relates to the field of power supplies. More particularly, the present invention relates to a power converter system with modulated control.

BACKGROUND

Every electrical device that connects with a power supply main is required not to pollute or transmit high frequency noise onto the main. The amount of electrical emission allowed by electrical devices is heavily regulated by the Federal Communications Commission (FCC). Conventional power supply designs have migrated to using higher operating frequencies since the higher operating frequencies allow a reduction in size of power supply components and allow a reduction in cost. The disadvantage of operating at higher frequencies is the increased production of higher order harmonics or electromagnetic interference (EMI).

Conventional methods of reducing EMI have been aimed at reducing a switching frequency of a switching circuit below standard EMI bandwidth limits of 150 KHz as set by the FCC. This approach has the disadvantage of increasing the size of magnetic components in a power supply. Other methods of reducing EMI have simply been to add additional filter components to reduce unwanted frequency harmonics. This second approach has the disadvantage of adding to the weight, size and cost of power supplies. Another approach to reducing large spikes of harmonics or EMI is the use of a snubber circuit. The snubber circuit although effective in reducing EMI, compromises efficiency of a power converter. In yet another approach, EMI is reduced by using jitter that takes a discrete harmonic spectrum and spreads the EMI over a continuous frequency range. Conventional systems use jitter by injecting noise into a gate drive or controller of the converter. Injecting noise into the gate drive of the converter has the disadvantage of distorting the output voltage signal. Further, injecting noise directly into a gate drive only applies jitter to the rising and falling edges of the converter switching signal. Moreover, because the jitter is continuous throughout the cycles of the switching signal, is outside the bandwidth of the amplifier and is injected outside the regulation loop of the switching circuit, it causes unwanted high ripple on the output of the switching circuit. Accordingly, by continuously injecting jitter directly into the gate drive circuit, conventional power converters inhibit the efficiency of feedback loop and other features including zero voltage switching and sampling of the switching signal.

SUMMARY OF THE INVENTION

An EMI emission suppressing system, apparatus and method includes a frequency modulation element that modulates the frequency of a switching element when the switching element is drawing power from the main power supply in order to reduce EMI emissions on the main power supply. The frequency modulation element discontinues modulation when the switching element is not drawing power from the main power supply in order to reduce ripple on the load. As a result, the EMI emission suppressing system is able to minimize EMI emissions on the main power supply while not outputting excess ripple on the load.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION

Embodiments of the present application are directed to an EMI emission suppressing system, device and method. Those of ordinary skill in the art will realize that the following detailed description of the EMI emission suppressing system, device and method is illustrative only and is not intended to be in any way limiting. Other embodiments of the EMI emission suppressing system, device and method will readily suggest themselves to such skilled persons having the benefit of this disclosure.

Reference will now be made in detail to implementations of the EMI emission suppressing system, device and method as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of an EMI emission suppressing system, device and method are described herein. The EMI suppressing system, device and method enables the EMI produced by high frequency switching of a switching circuit to be suppressed via the transfer of the higher order harmonic emissions to a frequency range below the standard EMI bandwidth of less than 150 KHz. The transfer of the higher order harmonic emissions is accomplished by applying low frequency modulation or jitter into the feedback of a switching signal of the switching circuit. Further, this EMI suppression is able to be achieved with minimal added ripple on the output signal by using discontinuous modulations in the form of only applying the low frequency modulation when the switch or higher order harmonic producing element of the switching circuit is accessing or drawing power from the main power supply. As a result, when coupled with the main power supply the low frequency modulation is applied in order to affect the rising and falling edges of switching pulses of the switching circuit thereby substantially reducing EMI noise on the main power supply from the switching circuit. Conversely, when not accessing or drawing power from the main power supply the low frequency modulation is suspended in order to substantially reduce ripple on the output of the switching circuit.

Figure 1:
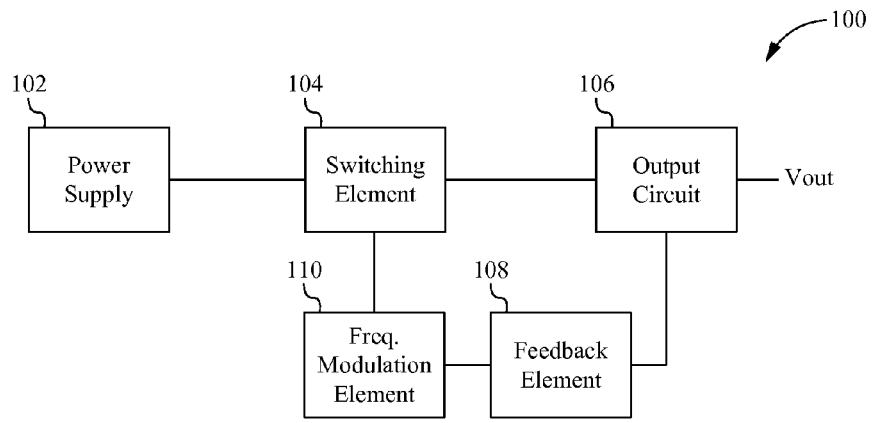
FIG. 1 illustrates a functional block diagram of an EMI suppression system according to some embodiments.

FIG. 1 illustrates a functional block diagram of an EMI suppressing system 100 according to some embodiments. As shown in FIG. 1, the system 100 includes a power supply 102, a switching element 104, a output circuit 106, a feedback element 108 and a frequency modulation element 110. The power supply 102 is coupled with the switching element 104 which is electrically coupled with the output circuit 106. The feedback element 108 is electrically coupled between the load 106 and frequency modulation element 110 which is electrically coupled with the switching element 104. Alternatively, the feedback element 108 is able to be directly coupled between the output circuit 106 and the switching element 104 and/or the frequency modulation element 110 is able to be electrically coupled with the switching element 104, the feedback element 108 or both.

The power supply 102 is able to include an AC power supply such as a main line or plug outlet. Alternatively, the power supply 102 is able to include a DC power supply. The switching element 104 is able to include a power converter circuit, such as a flyback converter. Alternatively, the switching element 104 is able to include other types of circuits that include switching elements or otherwise produce EMI emissions. For example, the switching element 104 is able to include a forward converter, a push-pull converter, a half-bridge converter, a full-bridge converter and/or other configurations of switch mode power supplies as are well known in the art. The frequency modulation element 110 is able to include a signal or clock generator. Alternatively, the frequency modulation element 110 is able to include other signal generation or modulation elements that are able to induce low frequency jitter on a signal as are well known in the art. In some embodiments, the frequency modulation element 110 is able to be integrated with the switching element 104, the output circuit 106 and/or the feedback element 108 to form a single integrated circuit. Alternatively, the frequency modulation element 110 is able to include an individual integrated circuit that is able to be coupled to one or more separate circuits such as switching element, output circuit and/or feedback circuits. As a result, the frequency modulation element 110 is able to provide the advantage of being coupled to existing integrated circuits in order to improve their EMI suppression characteristics.

In operation, the switching element 104 periodically couples to or pulls power from the power supply 102 and supplies a desired output voltage/signal to a load coupled to the output circuit 106. The feedback element 108 detects the output voltage Vout, or a representative value of the output voltage Vout, and adjusts the output of the switching element 104 in order to keep the output voltage Vout within a desired range, thereby regulating the output voltage Vout. In some embodiments, the feedback element 108 adjusts the duty cycle of the switching element 104 in order to control the output voltage Vout. The frequency modulation element 110 detects when the switching element 104 is pulling power from or coupled to the power supply 102 and applies low frequency modulation or jitter to the signal received from the feedback element 108 signal such that EMI caused by the switching element 104 and exposed to the power supply 102 is minimized. The frequency modulation element 110 also detects when the switching element 104 is not pulling power from or is not directly coupled to the power supply 102 and ceases or discontinues to apply low frequency modulation or jitter on the switching element signal in order to minimize ripple on the output voltage/signal applied to the load. In some embodiments, the frequency modulation element 110 performs the detection and modulation within the feedback loop of the switching element 104. As a result, the jitter is only applied when the switching element 104 is coupled to the power supply 102 and the system 100 is able to minimize the amount of EMI transmitted on the power supply 102 from the switching element 104 while also minimizing the amount of ripple induced on the output voltage/signal from the jitter of the frequency modulation element 110.

Figure 2:
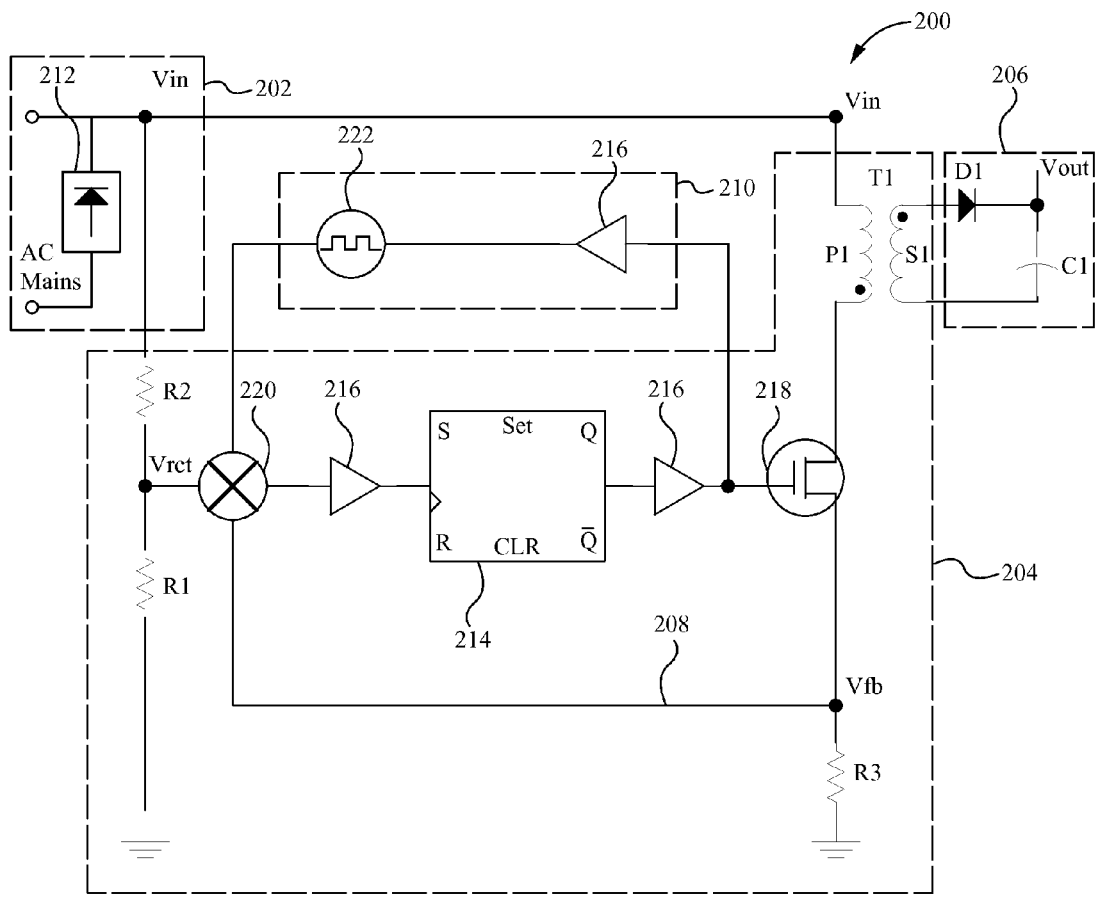
FIG. 2 illustrates a circuit diagram of an EMI suppression system according to some embodiments.

FIG. 2 illustrates a schematic diagram of an EMI suppression system 200 according to some embodiments. The schematic diagram is substantially similar to the functional block diagram shown in FIG. 1 except the additional details described herein. However, it is understood that alternative schematics are able to be used to implement the functional blocks of FIG. 1. As shown in FIG. 2, the EMI suppression system 200 includes a power supply 202, a switching element 204, an output circuit 206, a feedback element 208 and a frequency modulation element 210. The system 200 is configured to receive an AC voltage signal and to provide a regulated DC output voltage Vout that is suitable for many low voltage appliances such as computer laptops, cell phones and other devices. In some embodiments, the output voltage Vout is able to be within the range 5-40V. Alternatively, the output voltage Vout is able to be less than 5V or more than 40V. In some embodiments, the system 200 is contained on a single integrated circuit. Alternatively, one or more of the components of the suppression system 200 are able to be separate integrated circuits such that the system 200 is formed by multiple integrated circuits electrically coupled together.

The power supply 202 includes an AC mains power signal that is electrically coupled with a rectifier 212 in order to produce an unregulated DC input voltage Vin that is electrically coupled to both the switching element 204 and the feedback element 208. The output circuit 206 includes a diode D1 and capacitor C1. Alternatively, the output circuit 206 is able to include an output rectifier circuit comprising a half or full-wave rectifier. The feedback element 208 provides a feedback voltage Vfb, which is representative of the output voltage Vout. The frequency modulation element 210 includes the signal generator or clock generator 222 and one or more buffers 216. The switching element 204 includes a transformer T1, a transistor 218, one or more resistors R1, R2, R3, a controller device 214, a summation device 220 and one or more buffers 216. Alternatively, one or more of the summation device 220, the controller device 214 and/or the buffers 216 of the switching element 204 are able to be a part of the frequency modulation element 210 instead of the switching element 204. Indeed, it is understood that one or more of the components of the power supply 202, the switching element 204, the output circuit 206, the feedback element 208 and/or the frequency modulation element 210 are able to be positioned or duplicated on one or more of the other elements 202-210.

A first end of the transformer T1 is electrically coupled between the input voltage Vin received from the power supply 202 and the drain terminal of the transistor 218. The second end of the transformer T1 is electrically coupled across the diode D1 and capacitor C1 of the output circuit 206. The source terminal of the transistor 218 is electrically coupled with the feedback element 208 and the resistor R3 which is electrically coupled to ground. The Q output line of the controller device 214 is electrically coupled with the gate terminal of the transistor 218 and the input of the signal generator 222 of the frequency modulation element 210 via one or more buffers 216. The S input line of the controller device 214 is electrically coupled with the output of the summation device 220 via another buffer 216. The inputs of the summation device 220 are electrically coupled with the feedback element 208, the output of the signal generator 222, and a reference voltage node Vref that is located between resistors R1 and R2 which are electrically coupled in series between the input voltage Vin and ground. The summation device 220 can be a comparator, an error amplifier or other device that modulates a difference, or error, between the reference voltage Vref and the feedback voltage Vfb, thereby outputting a modulated error signal. In some embodiments, the transformer T1 is a flyback transformer. Alternatively, the transformer T1 is able to be other types of transformers or load isolating circuitry as are well known in the art. In some embodiments, the signal generator 222 generates a clock signal at a predetermined frequency, such as in the range of 2.0 to 9.0 KHz. Alternatively, the predetermined frequency is able to be less than 2.0 KHz, greater than 9.0 KHz, or other predetermined frequencies as are well known in the art. In some embodiments, the transistor 218 is a field effect transistor such as a n-type metal-oxide-semiconductor field-effect transistor (MOSFET). Alternatively, the transistor 218 is able to be other types of transistors or switching circuitry as are well known in the art. For example, the switching element 204 is able to include a variable frequency converter, such that an operating bandwidth of the switching element 204 is able to be adjusted depending on output power requirements of the system 200. In some embodiments, the controller device 214 is a SR-NOR latch flipflop. Alternatively, the controller device 214 is able to be other types of flipflops, pulse width modulation circuits or signal logic circuitry able to regulate the duty cycle of the operation of the transistor 218 as are well known in the art.

In operation, the Q output of the controller device 214 of the switching element 204 outputs a switch control signal, or driving signal, to the gate terminal of the transistor 218 that causes the transistor 218 to repeatedly turn on and off. When the switch control signal is high, it activates the channel of the transistor 218 causing current from the power supply 202 to be drawn through the primary winding of the transformer T and the transistor 2181, through the feedback loop 208 and to ground through resistor R3. When the switch control signal is low, the channel of the transistor 218 is deactivated preventing current flow through the transistor 218 and therefore the primary winding P1, and the voltage across the primary winding P1 goes high and power is transferred to the output circuit 206. The summation device 220 receives a feedback signal from the feedback element 208 and compares the feedback voltage Vfb of the feedback signal to a reference voltage Vref in order to generate an error signal that is input to the S input of the controller device 214 and adjusts the duty cycle of the switch control signal such that a desired output voltage Vout is maintained. As a result, the switching element 204 regulates the output voltage Vout.

When the switch control signal is high such that the switching element 204 is accessing the power supply 202, the signal generator 222 outputs a low frequency modulation or jitter signal to the summation device 220 such that the error signal is modulated and the modulated error signal is input to the controller device 214 such that the corresponding switch control signal is modulated according to the low frequency modulation/jitter signal. As a result, the EMI caused by the switching element 204 on the power supply 202 is substantially reduced because the modulation of the switch control signal essentially takes the EMI spikes in the switching frequency and reduces and spreads out the EMI spikes over the frequency spectrum. When the switch control signal is low such that the switching element 204 is no longer accessing the power supply and power stored in the transformer T1 is transferred to the output circuit 206, the error signal is no longer modulated with the low frequency modulation signal. In some embodiments, the signal generator 222 only generates the low frequency modulation signal when the switching element 204 is accessing the power supply 202. In other embodiments, the signal generator 222 continuously generates the low frequency modulation signal, but the low frequency modulation signal is only used by the summation device 220 to modulate the error signal when the switching element 204 is accessing the power supply 202. As a result of selectively modulating the error signal and therefore selectively modulating the switching control signal, the ripple on the load caused by the modulated switching control signal is also minimized. Accordingly, the EMI emission suppression system 200 provides the advantage of maintaining maximum reduction of EMI polluted onto the power supply 202 while also minimizing ripple on the output circuit 206.

The system, device and method of EMI emission suppression described herein has many advantages. Specifically, the system minimizes the EMI emission output on a power supply by a switching element by modulating the frequency of the switching element using low frequency modulation in a feedback loop. Further, the system minimizes the ripple output on the load resulting from the low frequency modulation by using discontinuous modulation where the control signal is only modulated when the switching element is accessing the power supply. Thus, the EMI emission suppressor described herein has numerous advantages.

The EMI emission suppressing system, device and method is described above in terms of modulating a control signal used to regulate an output voltage. It is understood that the EMI emission suppressing system, device and method can alternatively be applied to non-regulating applications. Such alternative applications may or may not include a feedback element. The modulating signal may be applied to a reference or other signal used by the switching element to generate the modulated control signal.

The present application has been described in terms of specific embodiments incorporating details to facilitate the understanding of the principles of construction and operation of the EMI emission suppressing system, device and method. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. An apparatus comprising:
   a. a power conversion circuit coupled to a power supply and configured to output a regulated output voltage, wherein the power conversion circuit comprises a switching element configured to selectively draw power from the power supply; and
   b. a controller coupled to the switching element and configured to supply a driving signal to the switching element, wherein the driving signal is modulated according to a low frequency modulation signal when the switching element is drawing power from the power supply, and modulation according to the low frequency modulation signal is discontinued when the switching element is not drawing power from the power supply.

2. The apparatus of claim 1 wherein the driving signal modulated with the low frequency modulation signal substantially reduces electromagnetic interference corresponding to switching of the switching element.

3. The apparatus of claim 1 further comprising a feedback element coupled to the controller and configured to provide the controller with a feedback voltage representative of an output voltage.

4. The apparatus of claim 1 wherein the switching circuit draws power from the power supply when the switching circuit is turned ON, and the switching circuit does not draw power from the power supply when the switching circuit is turned OFF.

5. A power converter for converting power supplied from a power supply and supplying a regulated output voltage, the power converter comprising:
   a. a transformer comprising a primary winding and a secondary winding, wherein the primary winding is coupled to the power supply;
   b. an output circuit coupled to the secondary winding, wherein the output circuit is configured to output an output voltage;
   c. a switch coupled to the primary winding, wherein when the switch is ON power is drawn from the power supply and when the switch is OFF power is not drawn from the power supply;
   d. a signal generator configured to generate a low frequency modulation signal;
   e. a feedback element configured to supply a feedback signal representative of the output voltage at the output circuit;
   f. a modulation circuit coupled to the signal generator and to the feedback element, where the modulation circuit is configured to receive as input the low frequency modulation signal, the feedback signal, and a reference signal, and to output an error signal; and
   g. a controller circuit coupled to the modulation circuit and to the switch, wherein the controller circuit is configured to receive the error signal and to generate a driving signal for driving the switch, further wherein the error signal is modulated using the low frequency modulation signal when power is drawn from the power supply, and the error signal is not modulated using the low frequency modulation signal when power is not drawn from the power supply.

6. The power converter of claim 5 wherein the controller circuit is configured to use the error signal modulated by the low frequency modulation signal to generate the driving signal so as to substantially reduce harmonic distortion in a switching frequency of the switch.

7. The power converter of claim 5 wherein the modulation circuit comprises a summation circuit.

8. The power converter of claim 5 wherein the modulation circuit comprises an error amplifier.

9. The power converter of claim 5 wherein a frequency of the low frequency modulation signal is in the range of 2 to 9 Khz.

10. The power converter of claim 5 wherein the controller circuit is configured for generating a pulse width modulated signal for controlling a duty cycle of the switch.

11. The power converter of claim 5 wherein the switch comprises a transistor.

12. The power converter of claim 5 wherein the modulation circuit is configured to discontinue modulating the error signal using the low frequency modulation signal when power is not drawn from the power supply.

13. The power converter of claim 5 wherein the signal generator is configured to discontinue generating the low frequency modulation signal when power is not drawn from the power supply.

14. A power converter for converting power supplied from a power supply and supplying a regulated output voltage, the power converter comprising:
   a. a frequency modulation circuit configured to generate a low frequency modulation signal at a predetermined frequency;
   b. a summation circuit coupled to the frequency modulation circuit, wherein the summation circuit is configured to receive the low frequency modulation signal, a reference signal and a feedback signal and to output an error signal;
   c. a controller circuit configured to receive the error signal of the summation circuit and to generate a driving signal;
   d. a switching circuit configured to receive the driving signal, wherein the error signal is modulated using the low frequency modulation signal when the switching circuit is drawing power from the power supply, and the error signal is not modulated using the low frequency modulation signal when power is not drawn from the power supply; and
   e. an output circuit coupled with the switching circuit, the output circuit configured to output the regulated voltage signal, wherein the controller circuit uses the modulated error signal to substantially reduce harmonic distribution in a switching frequency of the switching circuit.

15. The power converter of claim 14 wherein the predetermined frequency comprises a frequency in the range of 2 to 9 Khz.

16. The power converter of claim 14 wherein the controller circuit is configured for generating a pulse width modulated signal for controlling a duty cycle of the switching circuit.

17. The power converter of claim 14 further comprising a feedback element configured to supply the feedback signal to the summation circuit, wherein the feedback signal is representative of an output voltage at the output circuit.

18. The power converter of claim 14 wherein the summation circuit comprises an operational amplifier.

19. The power converter of claim 14 wherein the switching circuit comprises a transistor.

20. The power converter of claim 14 wherein the frequency modulation circuit comprises a signal generator.

21. The power converter of claim 14 wherein the summation circuit is configured to discontinue modulating the error signal using the low frequency modulation signal when the switching circuit is not drawing power from the power supply.

22. The power converter of claim 14 wherein the frequency modulation circuit is configured to discontinue generating the low frequency modulation signal when the switching circuit is not drawing power from the power supply.

* * * * *